United States Patent
Pelaez et al.

(10) Patent No.: US 7,142,839 B2
(45) Date of Patent: Nov. 28, 2006

(54) DYNAMIC GROUPING OF WIRELESS TERMINAL

(75) Inventors: Mariana Benitez Pelaez, Naperville, IL (US); Anne Yin-Fee Lee, Naperville, IL (US); Samuel Stinson Mathai, Des Plaines, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 148 days.

(21) Appl. No.: 10/403,462

(22) Filed: Mar. 31, 2003

(65) Prior Publication Data

US 2004/0192350 A1 Sep. 30, 2004

(51) Int. Cl.
*H04M 11/00* (2006.01)
*H04B 7/00* (2006.01)
*H04Q 7/20* (2006.01)

(52) U.S. Cl. .................... 455/404.1; 455/519
(58) Field of Classification Search ............... 455/404, 455/404.1, 404.2, 456.1–456.3, 414.1, 519–521
See application file for complete search history.

(56) References Cited

U.S. PATENT DOCUMENTS

| | | | |
|---|---|---|---|
| 6,091,956 A * | 7/2000 | Hollenberg | 455/456.5 |
| 6,347,095 B1 * | 2/2002 | Tang et al. | 370/469 |
| 6,459,892 B1 | 10/2002 | Burgan et al. | 455/412 |
| 6,490,456 B1 | 12/2002 | Bogdan et al. | 455/456 |
| 6,909,903 B1 * | 6/2005 | Wang | 455/456.1 |
| 2002/0098849 A1 * | 7/2002 | Bloebaum et al. | 455/456 |
| 2003/0069002 A1 * | 4/2003 | Hunter et al. | 455/404 |
| 2004/0198376 A1 * | 10/2004 | Chandhok et al. | 455/456.1 |
| 2004/0203908 A1 * | 10/2004 | Hind et al. | 455/456.1 |
| 2004/0203910 A1 * | 10/2004 | Hind et al. | 455/456.1 |

* cited by examiner

*Primary Examiner*—Benny Q. Tieu
*Assistant Examiner*—Bing Q. Bui

(57) ABSTRACT

A system and method of transmitting media to a plurality of wireless terminals. The method includes forming a group of wireless terminals, and transmitting a group-specific media message to each of the wireless terminals in the group. The method can include forming a location-based group of wireless terminals disposed within a proximity of a location and transmitting a media message to each of the wireless terminals in the location-based group. The method can also include determining the location of the plurality of wireless terminals. The system includes a Location Server for determining the location of the plurality of wireless terminals and an Application Server for grouping the wireless terminals. The system also include a Call State Function Controller for routing calls thereby transmitting the group-specific media messages to the wireless terminals in the group via wireless interfaces.

17 Claims, 4 Drawing Sheets

DYNAMIC GROUPING OF WIRELESS TERMINAL

BACKGROUND OF THE INVENTION

The present invention relates to a system and method for providing communication with wireless terminals, and more particularly to a system and method of grouping wireless terminals to provide them with group-specific information.

Wireless terminals, including cellular phones such as 3$^{rd}$ Generation Partnership Project 3GPP and 3GPP2 devices, can receive and/or transmit a diverse type of multimedia such as data, text, special software applications, video, tty/ttd, etc., as well as voice communications. However, these capabilities have not been fully utilized as a means for providing useful information to wireless device users.

Typically, wireless devices have been considered separate, independent devices for providing mobility to users. Accordingly, little effort has been given to grouping these devices. It has been found desirable to further their media handling capabilities and their ability to provide useful information to users by grouping them.

SUMMARY OF THE INVENTION

According to the present invention, a system and method of transmitting media to a plurality of wireless terminals is provided.

In accordance with one aspect of the present invention, the method includes forming a location-based group of wireless terminals disposed within a proximity of a location and transmitting a group-specific media message to each of the wireless terminals in the location-based group. The method can also include determining the location of the plurality of wireless terminals.

In accordance with another aspect of the present invention, the method includes grouping the wireless terminals into a chat group, and providing communication between the wireless terminals in the chat group. The method can also include transmitting a group-specific media message to the chat group.

In accordance with yet another aspect of the present invention, the system includes a Location Server for determining the location of the plurality of wireless terminals and an Application Server for grouping the wireless terminals into a location-based group. The system also includes a Call State Function Controller for routing the media messages to the wireless terminals in the location-based group via wireless interfaces, such as those used in cellular communication systems.

The advantages and benefits of the present invention will become apparent to those of ordinary skill in the art upon reading and understanding the following detailed description of the preferred embodiments.

BRIEF DESCRIPTION OF THE DRAWINGS

The drawings are only for purposes of illustrating preferred embodiments and are not to be construed as limiting the invention. The invention may take form in various components and arrangements of components, and in various steps and arrangements of steps, preferred embodiments of which will be illustrated in the accompanying drawings wherein.

DETAILED DESCRIPTION OF THE INVENTION

It is to be understood that the specific devices and processes illustrated in the attached drawings, and described in the following specification are simply exemplary embodiments of the inventive concepts defined in the appended claims. Hence, specific examples and characteristics relating to the embodiments disclosed herein are not to be considered as limiting, unless the claims expressly state otherwise.

Figure 1:
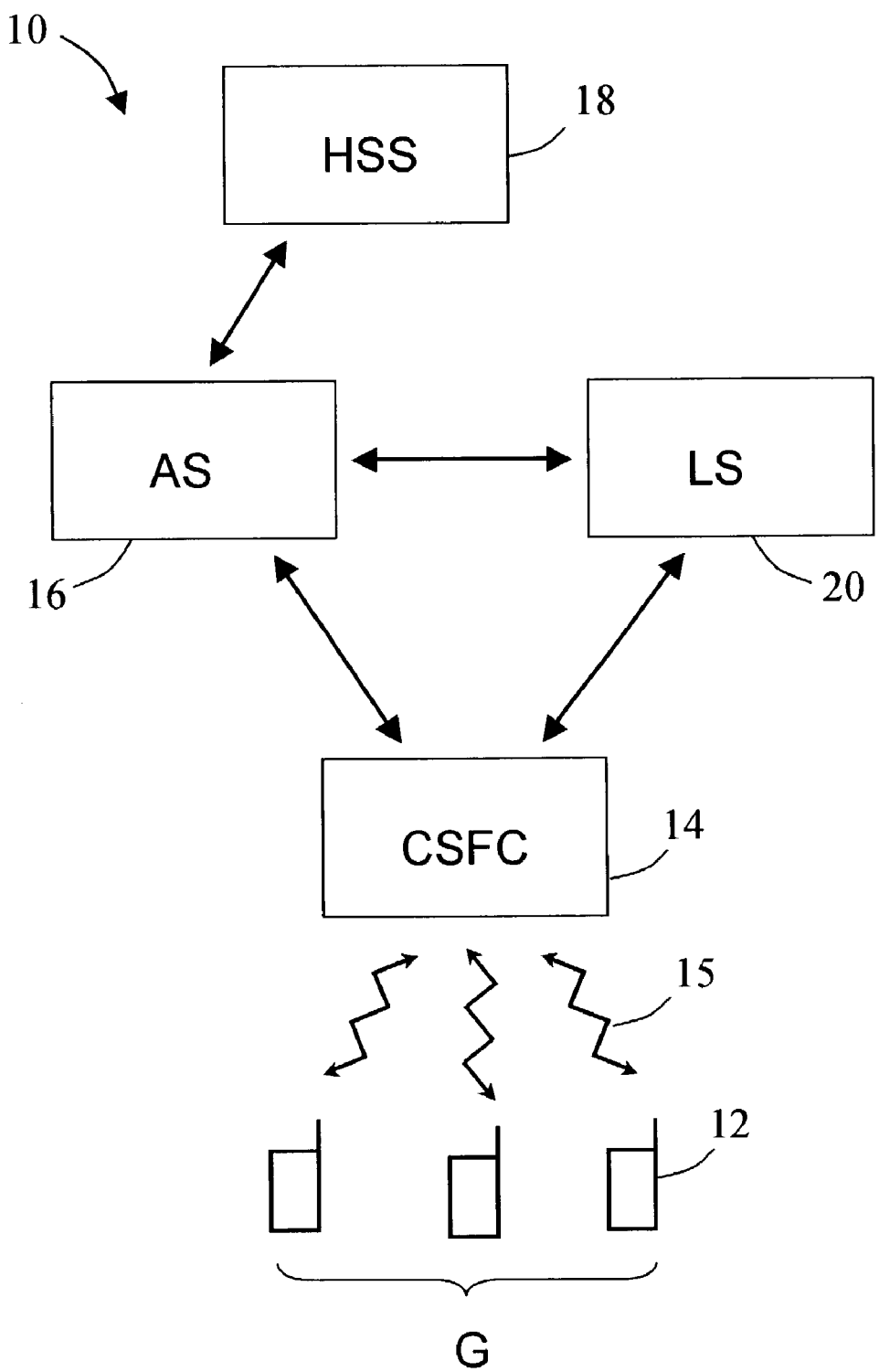
FIG. 1 is block diagram illustrating a wireless communications system in accordance with the invention.

Referring to FIG. 1, a wireless communications system is shown generally at 10 for transmitting media pertaining to a group, also referred to a group-specific media, to a group, referred to as G, of wireless terminals 12. The wireless terminals 12 can be cellular phones capable of handling various media such as data, text, special application, video, etc., as well as voice communications. Examples can include, but are not limited to 3GPP and 3GPP2 cellular phones. Alternatively, the wireless terminals 12 can be any other wireless terminals capable of receiving media from a wireless communications system 10. As shall be described in further detail below, the group G can be a location-based group, a chat group or group formed using any other suitable grouping criteria.

The system 10 includes one or more Call State Function Controllers (CSFC), one of which is shown at 14. The CSFC 14 is a known CSFC, for example one used for cellular communications. The CSFC 14 acts as a call gateway for routing calls to the wireless terminals 12 and transmitting the media messages to the wireless terminals via wireless interfaces 15. The CSFC 14 also executes call setups and call terminations in a known manner. The CSFC 14 routes the media messages to the wireless terminals 12 in the group G as described below.

The system 10 also includes one or more Application Servers (AS) 16 for performing the grouping of the wireless terminals 12 based on any suitable grouping criteria. Examples of the grouping criteria can include a proximity to a location used to form location-based group as described below, or common interests used to form a chat group as described below, or any other suitable grouping criteria. The AS 16 also controls the CSFC in order to direct the transmission of the media messages to the group of wireless terminals 12.

The system 10 includes a known Home Subscriber System (HSS) 18 which hosts the known network entity maintaining subscriber related data for each of the wireless terminals 12. For example, the HSS 18 includes information indicating that the wireless terminals can be grouped into a group in accordance with features of a paid subscription. More than one HSS 18 may be included in the system 10.

The system 10 includes one or more Location Servers (LS) 20 for determining which wireless terminals are within a proximity of a location. The Location Server 20 determines the position of each wireless terminal in any suitable known manner, an example which should not be considered limiting, is described in U.S. Pat. No. 6,490,456, issued Dec. 3, 2002 and assigned to Lucent Technologies, Inc. which is hereby incorporated by reference herein.

Figure 2:
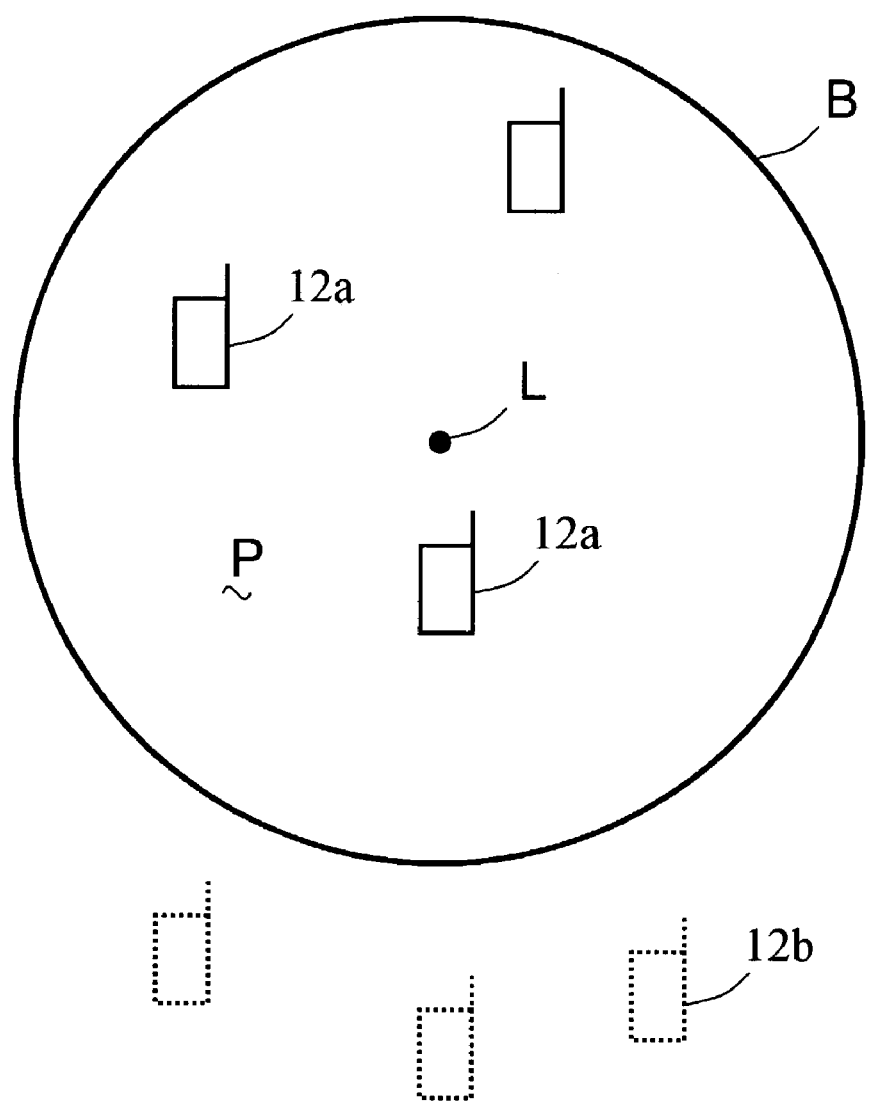
FIG. 2 is a diagram illustrating the location-based grouping of wireless terminals in accordance with the invention.

Referring to FIG. 2 the location-based grouping illustrated and the location is referred to as L. The location L can be an event such as a conference, a party, a meeting, a fire, etc. The location L can be stationary, such as a geographical destination including but not limited to a museum, a park, a building, etc. Alternatively, the location L may move, such as a storm. The proximity, referred to as P, is the area within boundary B. The proximity P can be any suitable area bounded by any suitable boundary B, examples of which can include an area within a building, an area defining a piece of property, or an area bounded by any radius extending from the location L.

The wireless terminals 12 within the proximity P, shown as 12a in FIG. 2, can be grouped into the location-based group G. Wireless terminals 12 not within the proximity P, shown with dashed lines as 12b, are not grouped into the location-based group G. The location-based group G is a dynamic group in which the number of wireless terminals in the group can change. For example, wireless terminals 12 entering the proximity P of the location L are added to the location-based group and wireless terminals leaving the proximity of the location are removed from the location-based group. The media message can be transmitted to each wireless terminal 12 after it is added to the group.

The Location Server 20 communicates with the Application Server 16 providing the locations of the wireless terminals. The Application Server 16 uses the location information to group the wireless terminals into a location-based group. The Application Server 16 includes the parameters needed for grouping such as the position of the location L, and the size of the proximity P. The Application Server 16 identifies each wireless terminal 12a in the group G in any suitable known manner, such as using a dynamic database which includes the wireless terminals Mobile Identity Number, or any other suitable identification information.

The CSFC 14 routes the media messages to the wireless terminals 12a in the location-based group G identified by the Application Server 16 in any suitable known manner. For example, the media message can be sent to all wireless terminals 12a in the group simultaneously using a known multicasting type function. Alternatively, the media message can be sent to the wireless terminals individually or in smaller groups as needed. For example, the media message can be sent to wireless terminals which enter the proximity P and thus become part of the location-based group.

Figure 3:
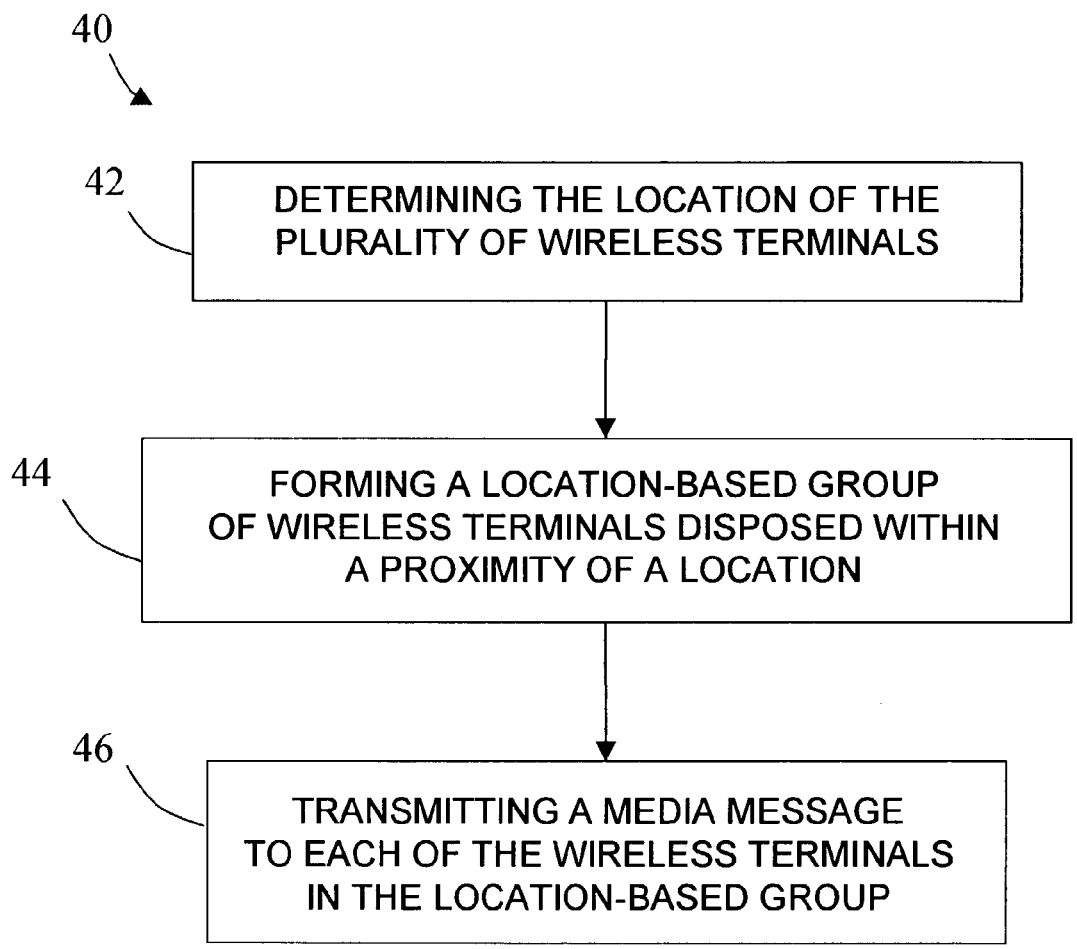
FIG. 3 is a flow diagram illustrating the steps of the invention.

Referring to FIG. 3, a method of transmitting group-specific media to a plurality of wireless terminals 12 in accordance with the invention is shown at 40. The method 40 can include the step of determining the position of wireless terminals at 42. The Location Server 20 determines the positions in any suitable known manner as described above.

The method 40 includes the step of forming a location-based group G of wireless terminals 12a located within a proximity P of a location L at 44. The Application Server 16 groups the wireless terminals 12a within the proximity P of the location L as described above. The step of forming the group can be dynamic, thereby continually changing the number of wireless terminals in the group as new wireless terminals meet the grouping criteria and others no longer meet the grouping criteria. For example, the number of wireless terminals in the location-based group can be increased for wireless terminals 12 entering the proximity P of the location L and decreased for wireless terminals leaving the proximity.

The method 40 further includes transmitting a media message pertaining to the group, also referred to as a group-specific media message, to each of the wireless terminals 12a in the location-based group G at 46. The media message can be any known media information which can be transmitted to the wireless devices using the wireless communications system 10, including but not limited to multimedia. The media message can be transmitted to each of the wireless terminals 12a in the location-based group G simultaneously, or individually as needed in any suitable known manner.

Examples of the invention can include transmitting an agenda, slides or video for a conference to the wireless terminals of all subscribers attending the conference. Another example can include transmitting building floor plans to all rescue workers, such as firemen and paramedics, in the proximity of a fire. Further, a wide range of group-specific media pertaining to the informational needs of the group can be transmitted to the wireless terminals in the group in accordance with the invention.

Figure 4:
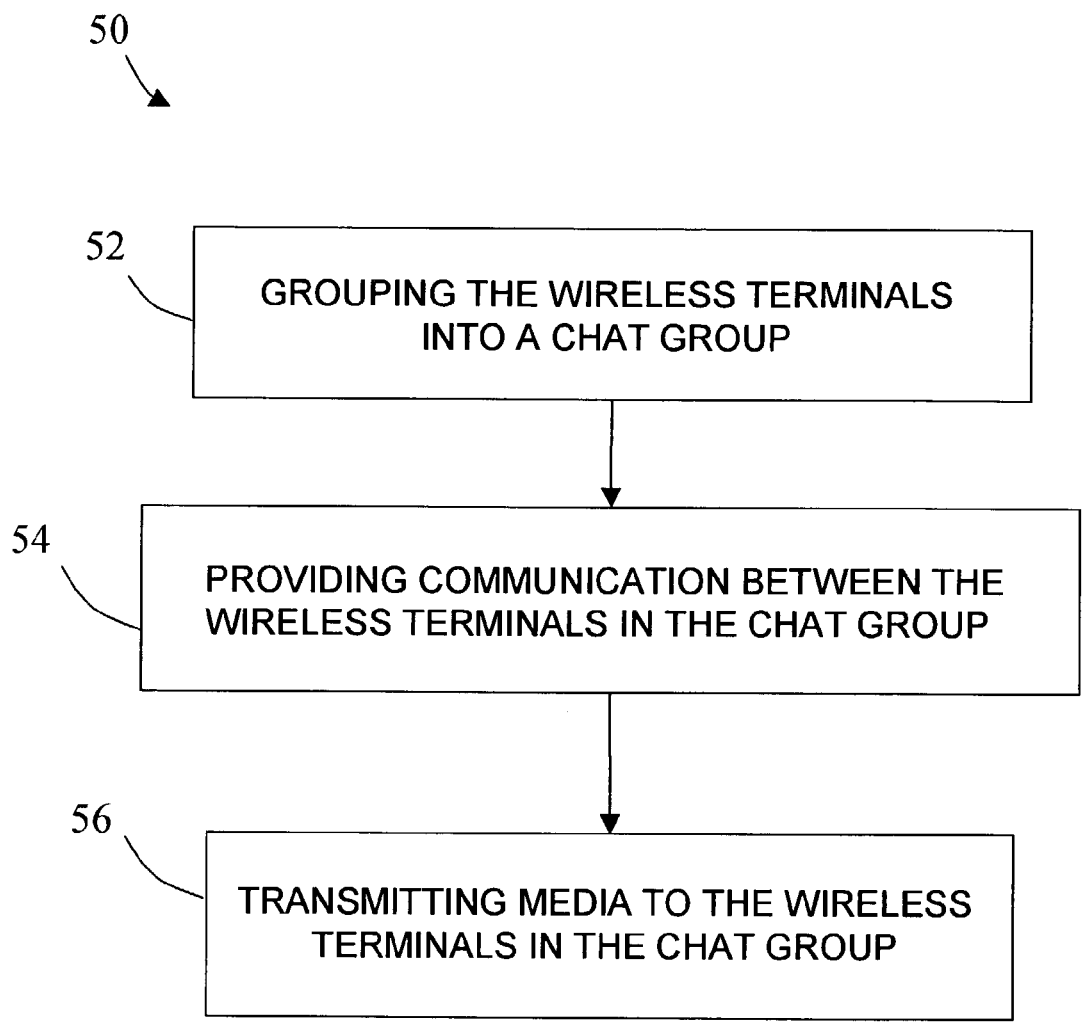
FIG. 4 is a flow diagram illustrating the steps of the invention.

Referring now to FIG. 4, the invention can also include a method shown generally at 50 of providing communications between a chat group consisting of a plurality of wireless terminals. The method 50 can include grouping the wireless terminals into a chat group at 52 and providing communication between the wireless terminals in the chat group at 54. The method can further include the CSFC 14 transmitting group-specific media to the chat group at 56 in a similar manner as providing the media to the location-based group described above. The CSFC 14 can provide communications between all wireless terminals in the chat group in any suitable known manner.

The wireless terminals can be grouped into the chat group by the Application Server 16 in accordance with subscriber information provided by the Home Subscriber System 18. For example, the Application Server 16 can group the wireless terminals based on the interests, or the ages, or any other suitable criteria of the wireless terminal users provided by subscription information provided by the HSS 18.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A method of transmitting media to a plurality of wireless terminals via a wireless telecommunications network comprising:
   a wireless telecommunications network determining the locations of wireless terminals disposed within a proximity of a location;
   a wireless telecommunications network forming a dynamic location-based group of the wireless terminals disposed within the proximity of the location, wherein the number of wireless terminals in the group changes as wireless terminals enter or leave the proximity;
   transmitting a group-specific media message from the wireless telecommunications network to each of the wireless terminals in the group;
   adding new wireless terminals entering the proximity of the location to the dynamic location-based group; and
   transmitting the group-specific media message to the new wireless terminals added to the dynamic location-based group.

2. The method defined in claim 1 wherein the transmitting step includes transmitting the media message simultaneously to each of the wireless terminals in the group.

3. The method defined in claim 1 wherein the wireless terminals are cellular phones.

4. The method defined in claim 1 wherein the location is the location of an event.

5. The method defined in claim 1 wherein the location is the location of a fire and the group-specific media message includes building floor plans.

6. The method defined in claim 1 wherein the location is the location of a conference and the group-specific media message includes at least one of an agenda for the conference, slides for the conference, and video for the conference.

7. The method defined in claim 1 wherein the location is the location of a party.

8. The method defined in claim 1 wherein the forming step includes grouping the wireless terminals determined to be within the proximity of the location into a chat group.

9. The method defined in claim 8 further including providing communication between the wireless terminals in the chat group.

10. The method defined in claim 1 wherein the step of forming a dynamic location-based group includes using grouping parameters including the position of the location, the size of the proximity and wireless terminal identifiers.

11. The method defined in claim 1 wherein the location is a building and the group-specific media message includes building floor plans.

12. A wireless communications system for transmitting media to a location-based group of wireless terminals comprising:
   a wireless network Location Server for determining the wireless terminals disposed within a proximity of a location;
   a wireless network Application Server for grouping the wireless terminals disposed within the proximity of the location into a dynamic location-based group, wherein the Application Server adds new wireless terminals entering the proximity to the location-based group; and
   a wireless network Call State Function Controller for transmitting group-specific media to the group of wireless terminals over a wireless interface, wherein Call State Function Controller transmits the group-specific media to the new wireless terminals entering the proximity.

13. The wireless communications system defined in claim 12 wherein the Application Server includes a dynamic database identifying the wireless terminals in the location-based group.

14. The wireless communications system defined in claim 12 wherein the Application Server groups the wireless terminals into a chat group.

15. The wireless communications system defined in claim 14 wherein the Call State Function Controller provides communication between the wireless terminals in the chat group.

16. The wireless communications system defined in claim 12 further including a Home Subscriber System for providing wireless subscriber information to the Application Server indicating that wireless terminals can be grouped in the group.

17. The wireless communications system defined in claim 12 wherein the Call State Function Controller transmits the group-specific media to each wireless terminal simultaneously.

* * * * *